(12) United States Patent
Kumlin et al.

(10) Patent No.: US 8,611,083 B2
(45) Date of Patent: Dec. 17, 2013

(54) SYSTEM AND METHOD FOR COOLING A COMPUTER

(75) Inventors: Tyrell K. Kumlin, Calgary (CA); Luc W. Labonte, Calgary (CA); Trentent Tye, Calgary (CA); Zack P. Macgregor, Calgary (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1413 days.

(21) Appl. No.: 11/946,792

(22) Filed: Nov. 28, 2007

(65) Prior Publication Data

US 2009/0133858 A1    May 28, 2009

(51) Int. Cl.
*H05K 7/20* (2006.01)

(52) U.S. Cl.
USPC ....... 361/679.53; 361/699; 165/108; 165/132

(58) Field of Classification Search
USPC ............ 361/699, 679.53, 687; 165/108, 132
See application file for complete search history.

(56) References Cited

U.S. PATENT DOCUMENTS

| | | | |
|---|---|---|---|
| 5,323,847 A * | 6/1994 | Koizumi et al. | 165/104.33 |
| 5,731,954 A * | 3/1998 | Cheon | 361/699 |
| 6,166,907 A * | 12/2000 | Chien | 361/699 |
| 6,196,003 B1 * | 3/2001 | Macias et al. | 62/3.7 |
| 6,234,240 B1 * | 5/2001 | Cheon | 165/80.3 |
| 6,542,361 B2 * | 4/2003 | Paradis | 361/679.47 |
| 6,725,682 B2 | 4/2004 | Scott | |
| 6,763,880 B1 * | 7/2004 | Shih | 165/80.4 |
| 6,856,509 B2 * | 2/2005 | Lin | 361/679.02 |
| 6,955,212 B1 * | 10/2005 | Hsieh | 165/80.4 |
| 7,174,738 B2 * | 2/2007 | Scott | 62/259.2 |
| 7,273,088 B2 * | 9/2007 | Malone et al. | 165/80.4 |
| 7,333,334 B2 * | 2/2008 | Yamatani et al. | 361/701 |
| 7,344,101 B2 * | 3/2008 | Gavit et al. | 242/348 |
| 2001/0008071 A1 * | 7/2001 | Macias et al. | 62/3.7 |
| 2001/0043460 A1 * | 11/2001 | Harrison et al. | 361/687 |
| 2003/0201095 A1 * | 10/2003 | Liu | 165/164 |
| 2004/0008483 A1 * | 1/2004 | Cheon | 361/687 |
| 2004/0123614 A1 * | 7/2004 | Stewart | 62/259.2 |
| 2005/0013113 A1 * | 1/2005 | Lin | 361/687 |
| 2007/0109739 A1 * | 5/2007 | Stefanoski | 361/687 |

OTHER PUBLICATIONS

Swiftech H20-220 Apex "Ultra" CPU Liquid Cooling Kit, 2006, found at http://www.swiftnets.com/products/H20-220-APEX.asp.
Swiftech H20-80 MICRO CPU Liquid Cooling Kit, found at http://www.swiftnets.com/products/h20-80-MICRO.asp.
Swiftech H20-120 COMPACT CPU Liquid Cooling Kit, found at http://www.swiftnets.com/products/h20-120-compact.asp.
Swiftech H20-220 Apex Ultra+System Cooking Kit, 2006, found at http://www.swiftnets.com/products/H20-220-APEX-plus.asp.
Swiftech 2005 MCRES-1000 Assembly Guide, Bill of Materials.
Swifttech MCRES-1000™ Assembly, found at http://www.swiftnets.com/products/MCRES-1000.asp.
Swiftech H20-220 Apex "Ultra" CPU Liquid Cooling Kit, 2006, found at http://www.swiftnets.com/products/H20-220-APEX.asp, last accessed Nov. 28, 2007.

(Continued)

*Primary Examiner* — Anatoly Vortman

(57) ABSTRACT

Provided is a system and method of circulating a cooling fluid in a cooling system. For example, provided is a system, comprising a modular unit configured to mount into a computer drive bay, comprising a pump and a reservoir, configured to gravity feed a fluid to the pump, wherein the reservoir is positioned at least partially directly above the pump.

20 Claims, 4 Drawing Sheets

(56) References Cited

OTHER PUBLICATIONS

Swiftech H20-80 MICRO CPU Liquid Cooling Kit, found at http://www.swifnets.com/products/h20-80-MICRO.asp, last accessed on Nov. 28, 2007.

Swiftech H20-120 COMPACT CPU Liquid Cooling Kit, found at http://www.swiftnets.com/products/h20-120-compact.asp, last accessed on Nov. 28, 2007.

Swiftech H20-220 Apex Ultra+System Cooking Kit, 2006, found at http://www.swifnets.com/products/H20-220-APEX-plus.asp, last accessed on Nov. 28, 2007.

Swiftech 2005 MCRES-IOOO Assembly Guide, Bill of Materials, last revision date Apr. 8, 2005.

Swifttech MCRES-I000™ Assembly, found at http://www.swiftnets.com/products/MCRES-IOOO.asp, last accessed on Nov. 28, 2007.

* cited by examiner

SYSTEM AND METHOD FOR COOLING A COMPUTER

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Computers and other electronic devices generally include various computing components, such as processors and memory. Unfortunately, the computing components can produce a significant amount of heat during operation, thereby affecting the performance of the component itself and other surrounding components and devices within the system. Existing computers employ fans and other cooling solutions; however, these solutions consume a considerable amount of space and/or may fail to adequately cool the components. Further, as the computing power increases many components consume greater amounts of power and produce an increasing amount of heat. A prevalent practice is to increase the number and flow rate of fans in the system, which may or may not improve heat removal from the components. One alternative is liquid cooling. Unfortunately, liquid cooling systems may require substantial modifications to the system and/or external mounting of components. In addition, the setup and operation of liquid cooling systems may include challenges, such as filling the unit with a cooling fluid, preventing air from entering the system, operating at low fluid levels, and enabling a user to maintain the cooling system effectively.

BRIEF DESCRIPTION OF THE DRAWINGS

Advantages of one or more disclosed embodiments may become apparent upon reading the following detailed description and upon reference to the drawings in which.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
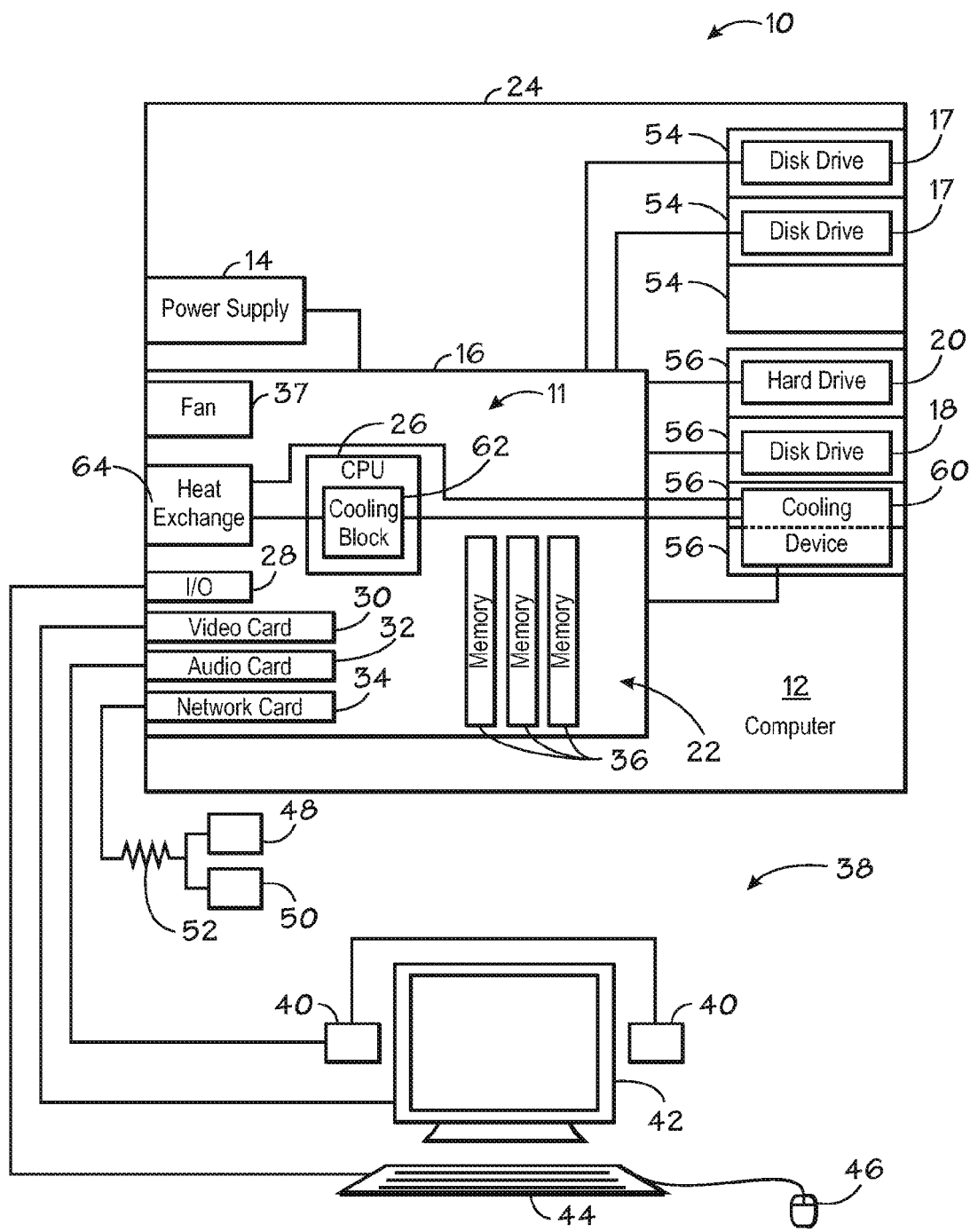
FIG. 1 is a block diagram of an embodiment of a computer system having a liquid cooling system.

FIG. 1 is a block diagram of an embodiment of a computer system 10 having a liquid cooling system 11 configured to remove heat from components of the computer system. As discussed in further detail below, the cooling system 11 includes a cooling device 60, including a pump, that is configured to circulate a cooling fluid through various components of the system 10. For instance, the cooling device 60 provides a cooling fluid to a cooling block 62 that is coupled to a central processing unit (CPU) 26 in a manner configured to enable removing heat from the CPU 26. As the cooling fluid is passed through the cooling block 62, the cooling fluid is warmed by the heat absorbed from the CPU 26. The fluid is circulated to a heat exchanger 64 to dissipate the absorbed heat, and is then returned to a reservoir of cooling fluid. The cooling device 60 generally includes the fluid reservoir in fluid communication with the pump, such that the fluid is continuously circulated within the cooling system 11. Certain embodiments of the cooling device 60 include locating the pump at least substantially below the reservoir, such that fluid is drawn from the lower portion of the reservoir into the pump with the aid of gravity, i.e., gravity-fed. Further, certain embodiments include configurations of the reservoir and the pump that enable fluid to be circulated when the fluid level is low, and configurations that discourage air and air bubbles from being drawn into the pump. This may be beneficial because, if air is introduced into the pump, the air may prevent the pump from pressurizing the fluid and, as a result, cause the pump to overheat. Embodiments also include a fill port positioned near the front of the reservoir and generally away from an intake of the pump. The location of the fill port may enable easy access for filling of the reservoir and may discourage air and air bubbles from entering the pump during filling. Embodiments of the cooling device 60 are generally configured for use in standard computer drive bays, e.g., 3.5 inch or 5.25 inch drive bays. In some embodiments, the cooling device 60 is configured for mounting into two similarly oriented drive bays.

As further illustrated in FIG. 1, the computer system 10 includes a computer 12 having a power supply 14, a mother board 16, optical and/or magnetic disk drives 17 and 18, a hard drive 20, and a plurality of components 22 disposed on the motherboard 16, all within a chassis 24. For example, the illustrated components 22 include a central processing unit (CPU) 26, an input/output (I/O) circuit 28, a video card 30, an audio card 32, a network card 34, and memory 36, all disposed on the motherboard 16. A fan 37 is included to generate an air flow that provides general cooling of components 22 within the chassis 24. The illustrated computer system 10 also includes a plurality of peripherals 38 coupled to the computer 12. For example, the peripherals 38 include speakers 40 coupled to the audio card 32, a display 42 coupled to the video card 30, a keyboard 44, and a mouse 46 coupled to the input/output circuit 28. Further, the illustrated computer system 10 may be coupled to other computers or devices 48 and 50 via a network 52 coupled to the network card 34.

Returning now to components and devices within the computer 12, the disk drives 17 and 18, and hard drive 20 are generally mounted in standard drive bays, including five and one-quarter inch (5.25 inch) drive bays 54 and three and one-half inch (3.5 inch) drive bays 56. The illustrated computer system 10 includes three of the 5.25 inch drive bays 54, one of which is empty. The computer system 10 also includes four 3.5 inch drive bays 56. Two of the drive bays 56 include the hard drive 20 and the disk drive 18. The other two bays 56 include the modular cooling device 60 that spans both of the bays 56. The cooling device 60 delivers cooling fluid to the cooling block 62 disposed on the CPU 26 and through the heat exchanger 64. As discussed in further detail below with reference to FIGS. 2-7, the cooling device 60 may take on a number of forms and configurations within the scope of the presently contemplated embodiments. For example, the cooling device 60 may have a standard form factor of a single or multiple 3.5 inch drives, 5.25 inch drives, or both.

Figure 2:
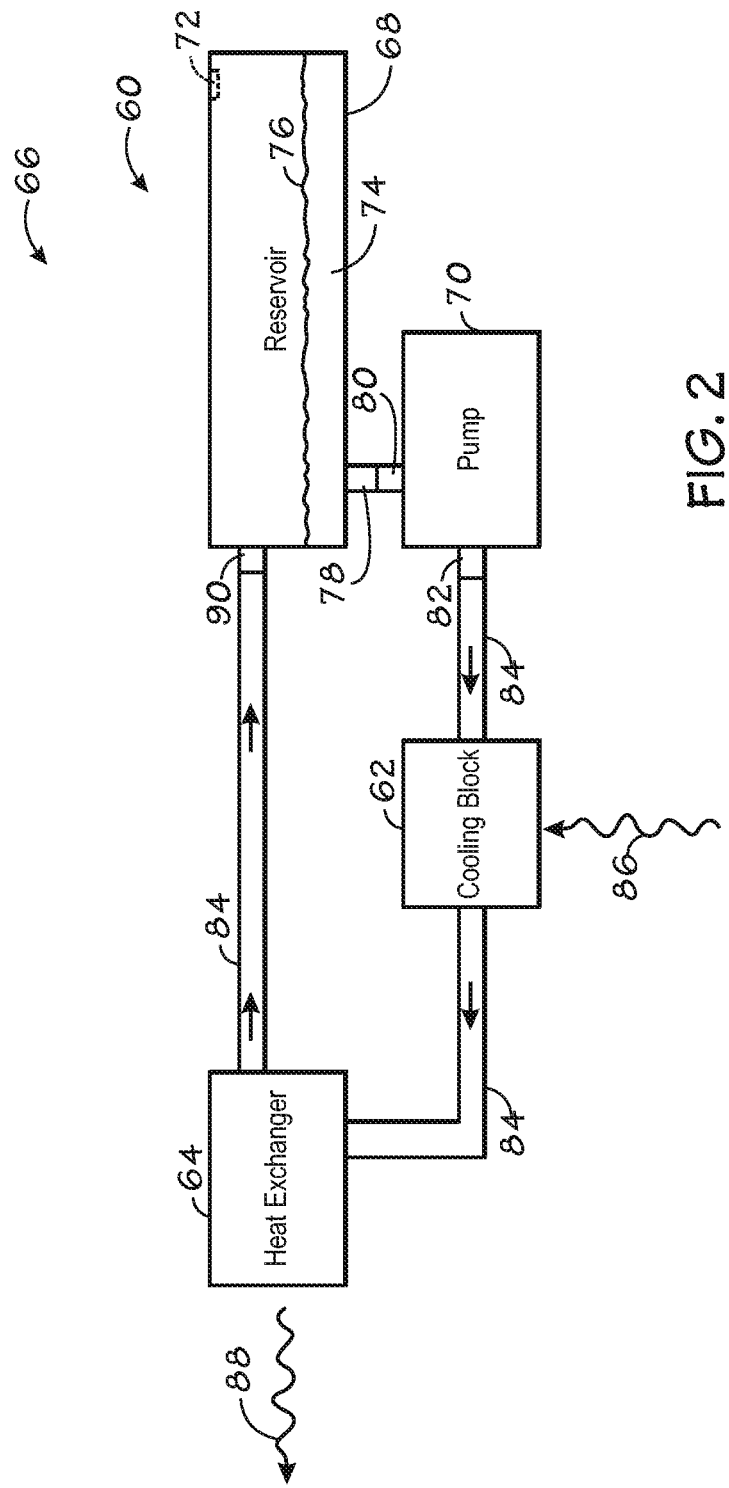
FIG. 2 is a block diagram of an embodiment of a liquid cooling system having a modular cooling device, including a reservoir and a pump.

FIG. 2 is a block diagram of the cooling system 66 wherein the modular cooling device 60 includes a reservoir 68 and a pump 70. For example, the illustrated reservoir 68 includes a fill port 72 to add a cooling fluid 74 to the reservoir 68. The fill port 72 includes a hole in the reservoir 68. Generally, a plug may be inserted into the fill port 72 to seal the fill port 72 and may be removed from the fill port 72 to enable cooling fluid 74 to be added to the reservoir 68. As the cooling fluid 74 is added to the reservoir 68, a fluid level 76 within the reservoir 68 generally increases. When a sufficient amount of fluid 74 is in the reservoir 68, gravity feeds the fluid 74 into the pump 70. Further, the fluid pump 70 draws the cooling fluid 74 from the drain port 78 of the reservoir 68 and into an inlet 80 of the pump 70.

The pump 70 generally includes a rotatable impeller configured to pressurize the fluid 74 and expel the fluid 74 through an outlet 82 of the pump 70. For instance, in one embodiment, the pump 70 may include a SWIFTECH MCP350 Industrial Pump manufactured by Swiftech of Lakewood, Calif. The pump 70 operates on power (e.g., 12 volts) provided by the power supply 14, and generates fluid flow. Accordingly, in operation fluid 74 is expelled from the outlet 82 of the pump 70 and routed into a tubing 84. The tubing 84 may include a vinyl type tubing with a ⅜ inch inside diameter (ID) and a ½ inch outside diameter (OD), for example.

As depicted, the tubing 84 routes the cooling fluid 74 to the cooling block 62. The cooling block 62 may be disposed on various components of the system 10, such as the CPU 26, as depicted in FIG. 1. In one embodiment, the cooling block 62 includes a machined copper base plate including fluid circulation cavities, or a combination thereof, for example. Passing the fluid 74 through portions of the cooling block 62 enables the cooling block 62 and the fluid 74 to absorb heat 86 from a component, such as the CPU 26. The fluid 74 may then be routed via the tubing 84 to the heat exchanger 64 to remove the absorbed heat from the fluid 74. For example, the heat exchanger 64 may include a fan, internal or external to the computer 12, that passes air over the tubing 84 to dissipate heat 88, as depicted. After exiting the heat exchanger 64, the fluid 74 is returned to a return 90 of the reservoir 68 via additional tubing 84. Further, while circulating in the reservoir 68, the fluid 74 may cool further before being re-circulated through the cooling system 66. In the depicted closed system, the fluid 74 is returned to the reservoir 68 at approximately the same rate as the fluid 74 is pumped out of the reservoir 68, thus, maintaining the fluid level 76.

In certain cooling systems 10, filling the reservoir 68 with the cooling fluid 74 may include a variety of techniques to prime the pump 70 and to prevent air from getting trapped in the pump 70. For example, a user may first pour a sufficient amount of fluid 74 into the fill port 72 of the reservoir 68 cover the drain 78 with fluid 74. Accordingly, if the pump 70 is operated, fluid 74, not air, is drawn into the pump 70. Then, the user may turn on the pump 70 to draw the fluid 74 from the reservoir 68 and into the tubing 84. Further, to enable the pump 70 to create suction, the user may also close the fill port 72 with a plug, such as an included rubber plug, to provide a fluid seal. However, in many situations it may be advantageous for the user to cover the fill port 72 with a finger. For example, during a fill process, as the fluid 74 is drawn into the tubing 84 and before the fluid 74 is returned to the reservoir 68, the fluid level 76 may drop in level such that more fluid 74 may be added. The fluid 74 may be added quickly to reduce the possibility of air being drawn into the pump 70, making the use of a temporary seal with a finger advantageous. Further, a user may simultaneously flip, twist, and rotate, etc., the reservoir 68 to keep the fluid level 76 at a sufficient level near the drain 78. In other words, filling the reservoir 68 may include a repeating sequence of a user pouring in fluid 74, covering the fill port 72 with a finger, rotating the reservoir 68, and subsequently adding fluid to the reservoir 68 in an attempt to fill the cooling system 66 while preventing air from being drawn in by the pump 70. In addition, when filling and during general operation, it may be beneficial for the pump 70 to be configured in a manner that reduces the introduction of bubbles in the fluid 74. Provided below are embodiments of the modular cooling device 60 that include the reservoir 68 and the pump 70 configured to simplify filling the reservoir 68 and to reduce the likelihood of air being drawn into the pump 70. The embodiments provide for positioning the pump 70 and the reservoir 68 such that the fluid 74 is gravity-fed into the pump 70. For example, the reservoir 68 may be vertically stacked at least partially above, substantially above, or entirely above the pump 70 rather than being in the same horizontal plane.

Figure 3:
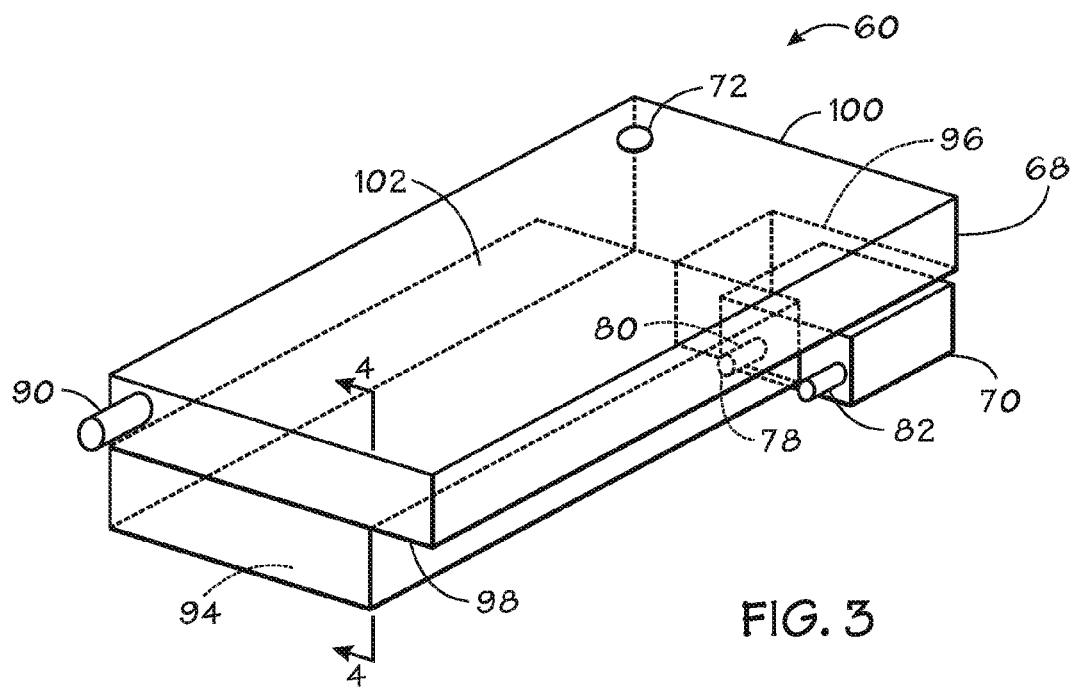
FIG. 3 is a perspective view of an embodiment of a modular cooling device having a pump disposed on the underside of a reservoir.
Figure 4:
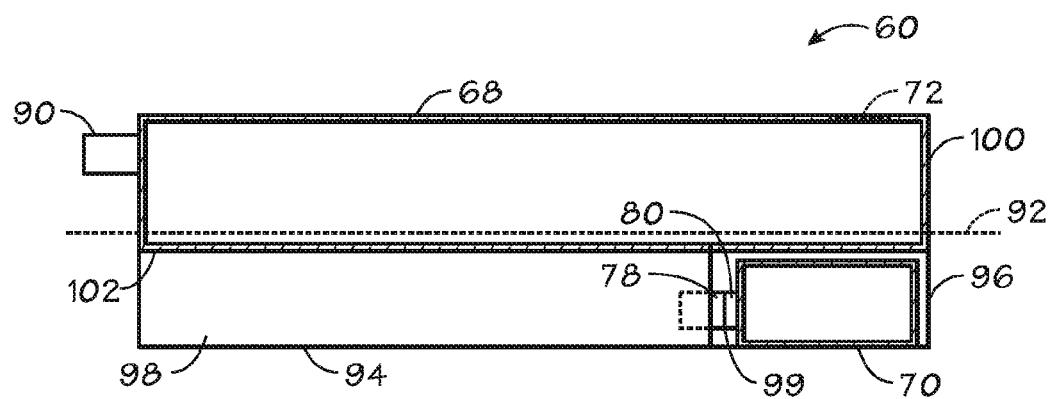
FIG. 4 is a sectional view across line 4-4 of the modular cooling device of FIG. 3.

FIGS. 3 and 4 illustrate a perspective view and a sectioned side view of an embodiment of the modular cooling device 60. The illustrated modular cooling device 60 includes the pump 70 disposed substantially below the reservoir 68. For example, the inlet 80 of the pump 70 is located below a centerline 92 of the reservoir 68, and near a bottom surface 94 of the reservoir 68. The centerline 92 may represent a fluid level 76 when the reservoir 68 contains a volume of fluid 74 that is approximately one half of the total fluid capacity of the reservoir 68. Accordingly, fluid 74 may enter the drain 78 of the reservoir 68 when the fluid level 76 is substantially below the centerline 92. In other words, because the drain 78 and inlet 80 are near the bottom of the reservoir 68, a relatively small amount of fluid 74 is sufficient to engulf the drain 78 and the inlet 80, such that the fluid is gravity-fed or sucked into the pump 70 without a likelihood of air being introduced to the pump 70. Other, embodiments may include locating the inlet 80 substantially below the reservoir 68, such that 50%, 60%, 70%, 80%, 90%, or more of the volume of the reservoir 68 is above the inlet 80. This may prove beneficial for at least three reasons. First, when filling the reservoir 68 as described above, the reservoir 68 may not need to be tilted to enable fluid to cover the drain 78, thereby, simplifying the process of filling the reservoir 68 through the fill port 72. Second, the fluid level 76 can drop very low without allowing air to be drawn into the pump 70, thereby, providing more time to add fluid 74 into the cooling device 60 during the filling process. Third, as the fluid 74 is moved (e.g., the reservoir is shaken or the fluid 74 flows through the return 90 and the reservoir 68) any bubbles that form are less likely to reach the volume near the bottom 94 of the reservoir 68 and, thus, are less likely to be drawn into the pump 70. For example, the increased depth of the drain 78 relative to a given fluid level 76 may prevent air from making its way into the lower volume of the fluid 74 in the reservoir 68.

The reservoir 68 illustrated in FIGS. 3 and 4 also includes various features to provide for locating the pump 70 substantially below the reservoir 68. For instance, on a bottom side of reservoir 68 there is a pocket 96 that includes a recessed portion in the reservoir 68 configured to accommodate the profile of the pump 70. In one embodiment, the pocket 96 may include a depression or shape to enable the pump 70 to be tucked under the reservoir 68. For example, the depicted pocket 96 includes a generally cuboid depression that enables the pump 70 to be housed substantially under the reservoir 68. As depicted, the pocket 96 is located in a lower corner underneath a portion of the reservoir 68. Other embodiments may include the pocket 96 in various locations and configurations. For example, the pocket 96 may be located at a corner near or at the same end of the reservoir 86 as the return 90. In the illustrated embodiment, the reservoir 68 is partially vertically stacked directly above the pump 70 and, also, partially horizontally side-by-side with the pump 70 disposed in the pocket 96. However, a substantial portion of the volume of the reservoir 68 is above the drain 78 and the inlet 80, thereby reducing the possibility of pumping air if the fluid level 76 is low.

Further, to accommodate the location of the pump 70 and or the pocket 96, the reservoir 68 may include additional features to provide for fluid flow within the cooling device 60. For example, the reservoir 68 of FIGS. 3 and 4 has a channel 98 that includes a recessed portion running a length of the reservoir 68. The channel 98 may provide for attachment of the tubing 84 from the outlet 82 of the pump 70 to other devices in the cooling system 66, including the cooling block 62. Such a channel 98 may prove beneficial for certain pumps. For instance the depicted pump 70 includes a 180 degree change in flow direction from the inlet 80 to the outlet 82. Other embodiments may include various channels, recessed portions and other geometric forms in the reservoir 68 to accommodate locating the drain 78 and the inlet 82 of the pump 70 near the bottom surface 94 of the reservoir 68. For example, in one embodiment, the channel 98 may include a semi-circular shape that is configured to secure the tubing 84 as it runs along the length of the reservoir 68. In other words, the channel 98 may be shaped such that the tubing 84 may be snapped into the channel 98 to secure the tubing 84 along the length of the reservoir 68.

The connection of the reservoir 68 to the pump 70 is generally represented by an interface 99 between the drain 78 and the inlet 80 of the pump 70. The actual configuration of the fluid path from the reservoir 68 to the pump 70 may take various forms and configurations. For example, the drain 78 and the inlet 80 may both include nipples with barb fittings configured to mate with tubing 84. Each nipple may include a ⅜ inch internal diameter and a ½ inch outer diameter, for instance. Accordingly, an embodiment may include a length of tubing 84 spanning a distance between the drain 78 and the inlet 80. Another embodiment may include a nipple inlet 80 protruding from the pump 70 and inserted into the body of the reservoir 68, such that the drain 78 includes a portion of the reservoir 68 (e.g., a hole) that fits around the inlet 80. Further, the connection 99 may include a male-to-female interference fit, an adhesive, or a plastic weld to provide a fluid seal. Other embodiments may include the use of any device and/or technique that provides for routing fluid flow from the reservoir 68 to the pump 70.

Similarly, the outlet 82 of the pump and the return 90 may include a nipple fitting having a barb configured to mate with the tubing 84. For example, the nipple may include a ⅜ inch internal diameter and a ½ inch outer diameter. Other embodiments may include methods and devices to attach the outlet 82 and the return 90 to the tubing 84 that are similar to those described above with regard to the drain 78 and the inlet 80 of the pump 70.

The cooling device 60 also includes the fill port 72 located near a front side 100 of the cooling device 60. The location of the fill port 72 near the front side 100 of the reservoir 68 may simplify the effort to fill the reservoir 68. For example, the cooling device 60 may be slid out of a front side of a drive bay 54 and/or 56 of the computer 12 to enable a user to pour in the fluid 74. With the fill port 72 located near the front of the reservoir 68, the cooling device 60 and/or reservoir 68 may be slid out a short distance to give a user enough clearance to access the fill port 72.

The location of the fill port 72 may also be advantageous to prevent air from being sucked into the pump 70. In one embodiment, the fill port 72 is not located proximate the drain 78. For example, as depicted, the fill port 72 is located on the opposite side of the reservoir 68 from that of the pump 70. Accordingly, air bubbles potentially resulting from fluid 74 being poured into the fill port 72 may return to the surface of the fluid 74 before the fluid reaches the drain 78 and the pump 70 and, thus, reduce the likelihood of air being drawn into the pump 70. Another embodiment may include locating the fill port 72 at the greatest reasonable distance from the drain 78. For example, the fill port 72 may be located at a top corner of the reservoir 68, and the drain 78 may be located at the opposite corner (e.g., caddy-corner) from the fill port 72. Other embodiments may include locating the fill port 72 at various locations on the reservoir 68. For example, the fill port 72 may be located near the center of the reservoir 68 or near the return 90.

In yet another embodiment, the reservoir 68 may include a baffle 102. The baffle 102 may include a planar protrusion internal to the reservoir 68 that generally separates the return 90 and the drain 78, such that turbulence is reduced in the fluid 74 as it circulates within the reservoir 68. In one embodiment, as depicted in FIGS. 3 and 4, the baffle 102 includes a horizontally oriented plane of material that directs flow within the reservoir 68. For example, the fluid 74 may flow over the baffle 102 before being circulated to the volume below the baffle 102. The baffle 102 may take a variety of shapes and configurations to reduce turbulence and the generation of air bubbles within the fluid 74. For example, an embodiment may include a baffle 102 that is oriented vertically within the reservoir 68 to separate the volume of fluid 74 on either side of the reservoir 68 (e.g., separate a side where the return 90 is located from a side where the drain 78 is located).

Figure 5:
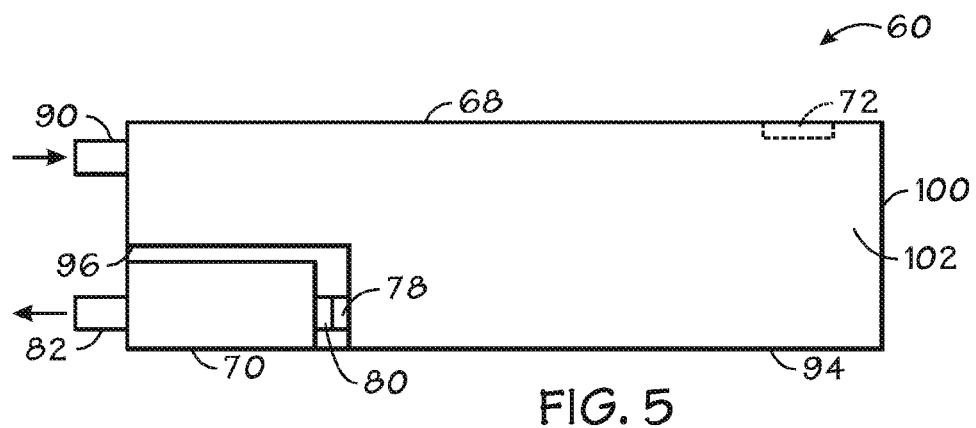
FIG. 5 is a side view of an embodiment of the modular cooling device of FIG. 2.

FIG. 5 illustrates an embodiment of the modular cooling device 60 having the pump 70 disposed below the reservoir 68 in a location near the back (e.g., on the side including the return 90) of the cooling device 60. As illustrated, the pump 70 includes an in-line configuration that enables locating the drain 78 near the back of the cooling device 60, a substantial distance from the fill port 72 that is generally located near the front of the reservoir 68. In such a configuration, the outlet 82 and the return 90 may be located proximate to one another such that routing the tubing 84 to components within the computer 12 is simplified. Other embodiments may include locating the pump 70 in various locations under the reservoir 68 to provide for generally gravity feeding the fluid from the reservoir 68 to the pump 70 via the drain 78 and the inlet 80.

Figure 6:
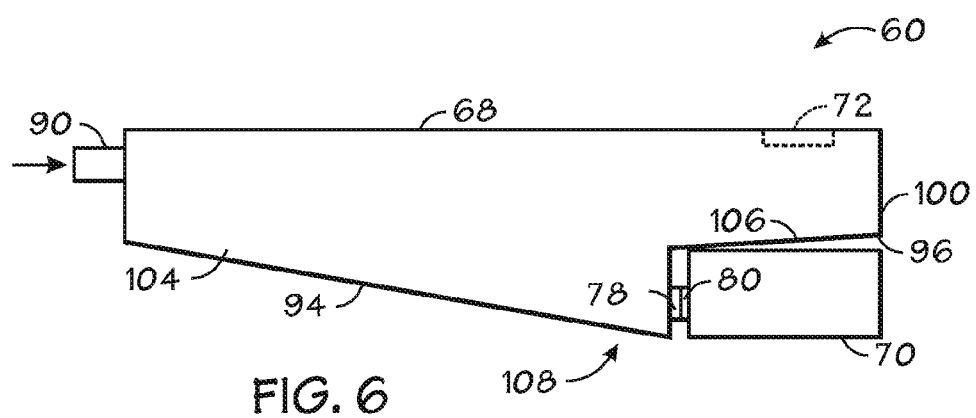
FIG. 6 is a side view of an embodiment of the modular cooling device of FIG. 2 including a reservoir having a funnel shaped geometry.

FIG. 6 illustrates an embodiment of the cooling device 60 wherein the reservoir 68 includes a generally funnel shaped geometry. As depicted, the reservoir 68 includes a first taper 104 and a second taper 106 (e.g., alone or together defining a funnel 108) configured to guide the flow of fluid 74 downwardly to the drain 78 and the inlet 80 of the pump 70. The tapers 104 and 106 generally create a funnel shape that includes a reduced volume near the bottom of the reservoir 68 (i.e., a reduced cross section near the drain 78). In other words, the funnel 108 enables a reduced amount of fluid 74 to provide a fluid level 76 that is capable of engulfing the drain 78 and the inlet 80 of the pump 70 such that air is unlikely to reach the pump 70. This may prove advantageous to at least reduce the amount of fluid 74 sufficient to operate the pump 70 and, also, simplify filling and maintenance of the cooling device 60 as discussed above. Other embodiments may include providing various downwardly tapered and/or curved surfaces to provide the reservoir 68 with a geometry that is configured to funnel the fluid 74 to the drain 78. Further, embodiments may include locating the pump 70 in various locations relative to the reservoir 68. For example, the pump 70 may be located near the center of the reservoir 68 or near the back of the reservoir 68 as discussed previously.

Figure 7:
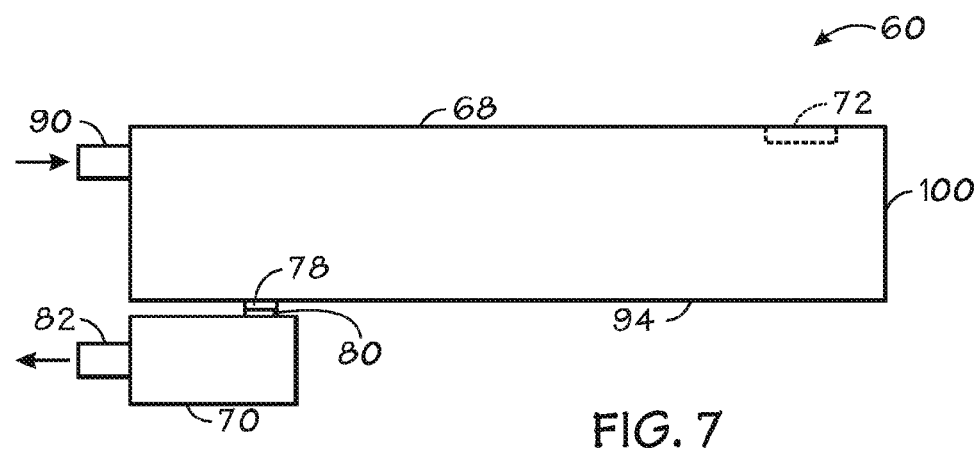
FIG. 7 is a side view of an embodiment of the modular cooling device of FIG. 2 including a drain on a bottom surface of the reservoir.

FIG. 7 illustrates an embodiment of the cooling device 60 that has the inlet 80 of the pump 70 oriented vertically, such that the fluid 74 may be gravity-fed from a drain 78 located on the bottom surface 94 of the reservoir 68. For example, one embodiment may include a pump 70 that includes a ninety-degree change in direction of fluid flow from the inlet 80 to the outlet 82 of the pump 70. In such a configuration, the fluid 74 may be gravity fed and/or sucked into the pump 70 and fed to tubing 84 near the back of the cooling device 60. The location of the drain 78 on the bottom surface 94 of the reservoir 68 may ensure that the pump 70 can operate at low fluid levels 76 with a reduced likelihood of air being sucked into the pump 70. Other embodiments may include the use of an in-line pump 70, as discussed with reference to FIG. 5, oriented vertically. Further, embodiments may include locating the drain 78 at various locations on the bottom surface 94 of the reservoir 68. For example, the drain 78 may be located at the end of the reservoir 68 near the fill port 72. In the illustrated embodiment, the reservoir 68 is positioned entirely above the pump 70 in a vertically stacked configuration. In some embodiments, the bottom surface 94 may be tapered downwardly toward the drain 78 and inlet 80 to function as a funnel.

The embodiments discussed with regard to FIGS. 2-7 may include any variety of combination of features to provide the cooling device 60 that is configured to provide gravity feeding of fluid 74 to the pump 70. In one embodiment the drain 78 on the bottom surface 94, as depicted in FIG. 7, may include a 180 degree pump as depicted and discussed with regard to FIGS. 3 and 4. In such an embodiment the drain 78 may be connected to the inlet 80 via tubing 84 that is flexed to provide the desired orientation of the outlet 82.

The overall size of the modular cooling device 60 may be configured for placement in one or more standard drive bays, (e.g., 54 and/or 56). Specifically, embodiments of the cooling device 60 include the reservoir 68 and the pump 70 arranged such that the cooling device 60 may be mounted into two of the 3.5 inch drive bays 56. The compact form factor of the cooling device 60 enables the cooling system 66 to take advantage of the 3.5 inch drive bays 56 that may be located within the computer 12 and which may otherwise be unused. An embodiment may also include reducing the size of the reservoir 68 and/or pump 70 to fit in a single 3.5 inch drive bay 56.

Further, embodiments of the cooling device 60 may be configured for placement in other locations within the computer 12, including the 5.25 inch drive bays 54. Accordingly, the reservoir 68 and the pump 70 may include a shape that is generally configured to mount within a single or multiple of the standard 5.25 inch drive bays 54. In another embodiment, the cooling device 60 may include a reservoir 68 and pump 70 configured for mounting within both a 5.25 inch drive bay 54 and a 3.5 inch drive bay 56.

What is claimed is:

1. A system, comprising:
 a modular unit configured to mount into a computer drive bay, comprising:
  a pump; and
  a reservoir, configured to gravity feed a fluid to the pump, wherein the reservoir is positioned at least partially directly above the pump, the reservoir comprising an outlet configured to enable substantially all of the fluid in the reservoir to feed into the pump as a fluid level drops.

2. The system of claim 1, wherein the modular unit is configured to mount simultaneously in a plurality of drive bays.

3. The system of claim 1, wherein the modular unit is configured to mount into one or more 3.5 inch computer drive bays.

4. The system of claim 1, wherein the modular unit is configured to circulate the fluid for liquid cooling of a computer component.

5. The system of claim 1, wherein the pump is located substantially below the reservoir.

6. The system of claim 1, wherein the pump is disposed entirely below the reservoir.

7. The system of claim 1, wherein the reservoir comprises a funnel portion.

8. The system of claim 1, wherein the pump and the reservoir are not entirely side-by-side in a horizontal configuration.

9. The system of claim 1, wherein the reservoir comprises a recessed portion on a lower surface of the reservoir, and wherein the recessed portion is configured to receive the pump.

10. The system of claim 1, wherein the reservoir comprises a fill port located a substantial distance from a pump intake.

11. The system of claim 1, wherein the reservoir comprises a fill port disposed at a front portion of the reservoir, such that the fill port is accessible without substantial removal of the modular unit from the computer drive bay.

12. A system, comprising:
 a modular unit configured to mount into a computer drive bay comprising:
  a fluid pump comprising a first inlet and a first outlet; and
  a fluid reservoir comprising a second inlet and a second outlet, the second outlet being coupled to the first inlet, the second outlet being configured to enable substantially all of a fluid in the reservoir to feed into the pump as the fluid level drops, wherein the fluid reservoir comprises a volume disposed at least substantially above the first inlet and the second outlet.

13. The system of claim 12, wherein the modular unit comprises a standard computer drive form factor.

14. The system of claim 13, wherein the standard computer drive form factor comprises a 3.5 inch computer drive form factor.

15. The system of claim 12, wherein the modular unit is configured to circulate a cooling fluid to provide cooling of one or more components of a computer system.

16. The system of claim 12, comprising a cooling block coupled to the first outlet and the second inlet.

17. The system of claim 16, wherein the cooling block is mounted on a processor.

18. The system of claim 12, comprising a computer having the modular unit disposed in a device bay.

19. A method, comprising:
  circulating a coolant fluid with a modular unit having both a fluid reservoir and a pump at least partially vertically stacked such that in use the reservoir is at least partially directly above the pump, the reservoir comprising an outlet configured to enable substantially all of the coolant fluid in the reservoir to feed into the pump as a level of the coolant fluid drops, the unit configured to mount in a computer drive bay.

20. The method of claim 19, comprising funneling the coolant fluid downwardly in the reservoir toward the pump.

\* \* \* \* \*